Patented Mar. 3, 1925.

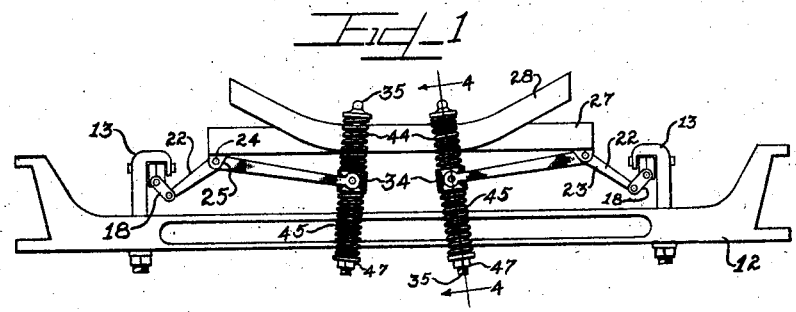
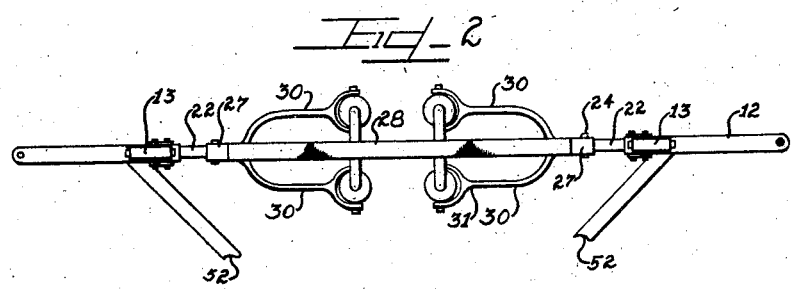
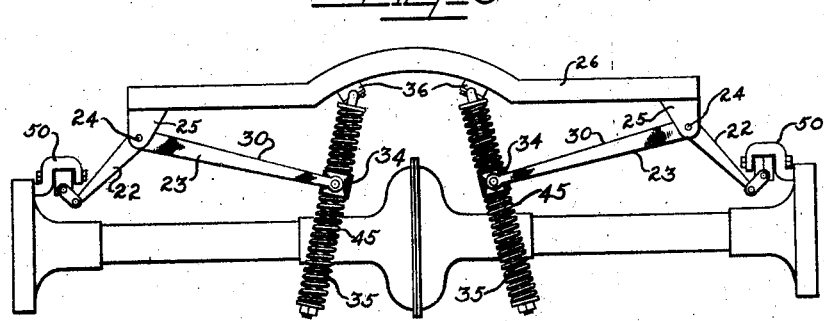

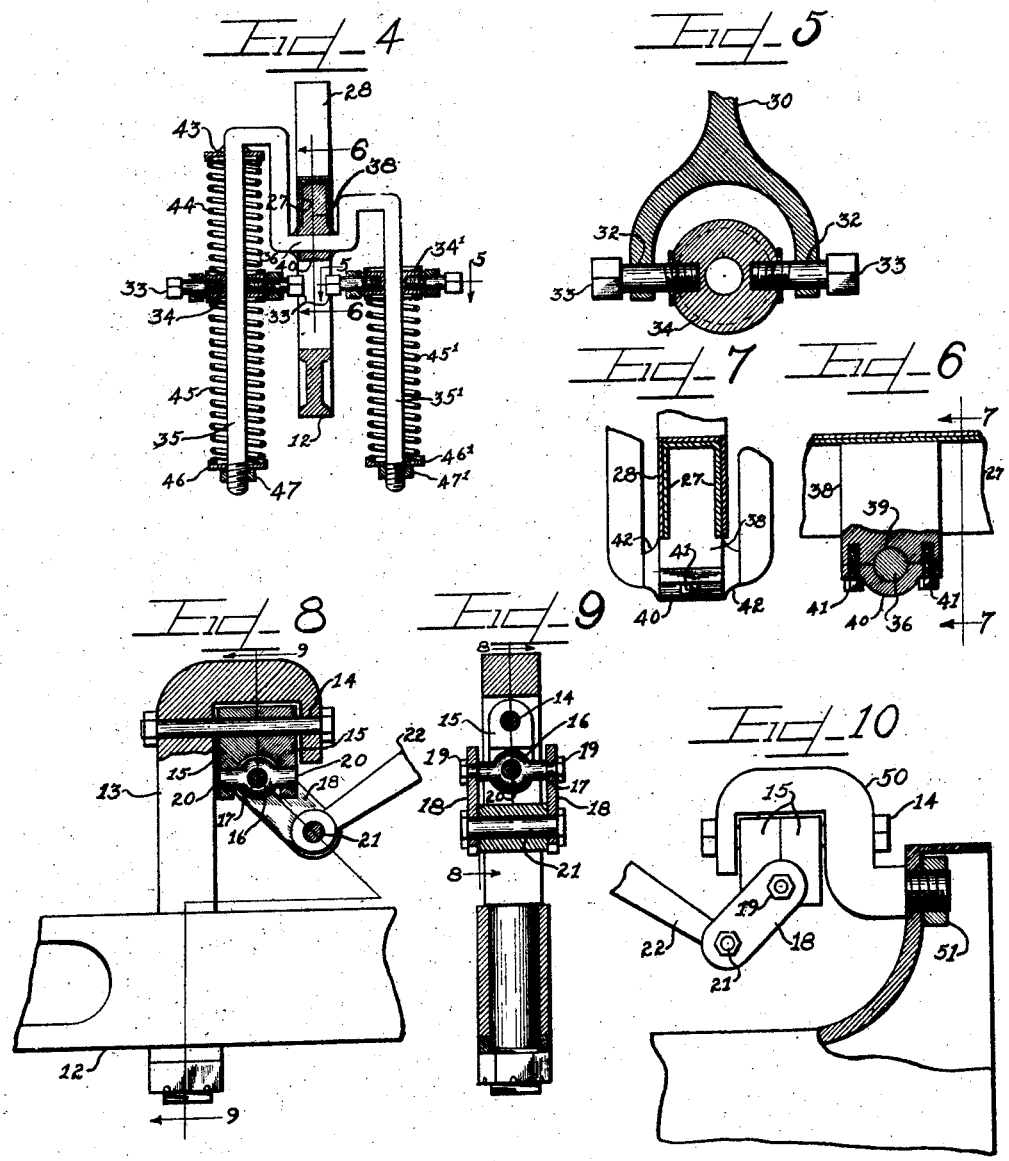

1,527,986

UNITED STATES PATENT OFFICE.

WILLIAM A. McCRACKEN AND ARTHUR H. BUTZKE, OF JOLIET, ILLINOIS.

SUPPORTING GEAR FOR VEHICLES.

Application filed August 7, 1922. Serial No. 580,272.

*To all whom it may concern:*

Be it known that we, WILLIAM A. MC-CRACKEN and ARTHUR H. BUTZKE, both citizens of the United States, and residents of the city of Joliet, in the county of Will and State of Illinois, have invented certain new and useful Improvements in a Supporting Gear for Vehicles; and we do hereby declare that the following is a full, clear, and exact description of the same, reference being had to the accompanying drawings, and to the numerals of reference marked thereon, which form a part of this specification.

This invention pertains to the arrangement by which the frame of a vehicle, such as an automobile, is supported from the axle. Heretofore a very common arrangement of such support is to provide leaf springs the ends of which are secured in stirrups and the middle part of which is secured to a supporting block. Forward and rearward motions of the vehicle result in torsional stresses set up in such springs.

It is an object of the present invention to devise a connection between the axles and the vehicle which shall avoid introducing torsional stresses into the springs.

It is a further object of this invention to provide a spring connection between the axle and the vehicle which shall serve to cushion not only the downward motion of the vehicle but also the upward motion.

It is a further object of this invention to provide a spring support for a vehicle wherein leaf springs are wholly replaced by coil springs.

It is a further object of this invention to provide such an arrangement in which the springs are wholly supported from the vehicle frame and not directly attached to the axle.

Other and further important objects of this invention will be apparent from the disclosures in the drawings and the specification.

The invention (in a preferred form) is illustrated in the accompanying drawings and hereinafter more fully described.

On the drawings: Figure 1 is a front view of the forward axle of an automobile with this invention applied thereto.

Figure 2 is a top plan view of the structure shown in Figure 1.

Figure 3 is an elevation of the rear axle of such an automobile.

Figure 4 is a section on the line 4—4 of Figure 1.

Figure 5 is a section upon the line 5—5 of Figure 4.

Figure 6 is a section upon the line 6—6 of Figure 4.

Figure 7 is a section upon the line 7—7 of Figure 6.

Figure 8 is a section upon the line 8—8 of Figure 9.

Figure 9 is a section upon the line 9—9 of Figure 8.

Figure 10 is an enlarged view of a portion of the structure of the rear axle, parts being shown in section.

As shown on the drawings: The front axle 12 is provided with the usual upstanding lugs or brackets 13 secured to the axle in any standard or desired way. These brackets have turned-over upper portions affording two pair of parts through which go bolts 14, as shown in Fig. 8. Two blocks 15 are pivotally mounted upon each bolt 14, each of the blocks being recessed and the recesses facing one another so as to supply a space for the ball 16 of a cross-shaped pivot member of a universal joint. The arm 17 of this pivot member is at right angles to a plane of the bolt 14. At each end of this arm it is reduced to accommodate a pair of links 18 which are held on the arm 17 by nuts 19. The other arm 20 of the cross-shaped member or pivot member of the universal joint is mounted at its ends in the sides of the recess formed by the blocks 15, as shown in Figure 8. Thus the pivot or cross-shaped member of the universal joint can let the links 18 rotate about either of two axes and can also move about the bolt 14 as a pivot.

The other end of the links 18 are secured together by a bolt 21 which forms the bearing for one end of the short arm 22 of a bell crank lever 23, which is pivoted to a bolt 24. The bolts 24 are mounted in ears 25. In the construction for the rear axle, these ears are attached to a part 26 of the frame of the vehicle. In the construction for the front axle, the ears 25 are attached to a piece 27 which goes through the channel of a member 28 whose cross section is channel shaped and which forms a part of the frame of the vehicle.

The long arm of the bell crank lever 23 is branched as is most clearly shown in Figure 2, having two branches 30. Each of these branches is branched again, as shown at 31, and most clearly illustrated in Figure 5, to form a pair of bearings 32 for studs 33 which are screwed into a collar 34, one collar for each branch 30. The collars 34 slide upon shafts 35 which go axially of certain coiled springs.

The form of the shaft 35 for use at the front axle is best illustrated in Figure 4. It is of the general shape of the letter U, the base of the letter having, however, a portion displaced toward the open end to afford a part 36 which acts as a bearing. In order to better connect the bearing for the part 36 with the cross piece 27, a filler block 38 is secured in the channel of the member 27 at the point where the bearing should be. The lower surface of the filler block is provided with a semi-cylindrical hollow 39 to serve as half of the bearing, and a cap 40 secured by screws 41 is made to complete the bearing. The crank-shaped portion of the shaft 35 which constitutes the bottom of the U is provided with flanges 42 by means of which the part 36 is held in position within the bearing.

Outside of the flanges 42 the shaft 35 extends upward a sufficient distance to accommodate full play of the collars 34 and leave room for the springs mounted thereon. Upon the forward side of the axle the upright portion of the shaft 35 is provided with a flange 43, the lower face of which is made concave in order to receive one end of a spring 44 and position the same concentric with the shaft 35. The other end of the spring 44 bears against the upper face of the collar 34. A spring 45, which is usually both longer and stronger than the spring 44, bears against the under side of the collar 34. The lower end of this spring is received in the concave side of a collar 46 similar to the flange 43. This collar is held in space by a nut 47, and by turning the nut 47 the tension of the spring 45 may be adjusted.

On the other arm of the U a similar arrangement may be made, or the spring corresponding to the spring 44 may be omitted and a spring 45', collar 46' and nut 47' corresponding exactly to the similarly described parts upon the first-described arm of the U complete the equipment of this arm. This arm of the U is made shorter if the spring corresponding to 44 is omitted and thus room is obtained for the engine or any other portion of the automobile which extends lower on the rear side of the axle than on the forward side.

The shafts 35 for the rear axle are formed and equipped similarly to the shafts 35 for the front axle. The brackets 50 for the rear axle corresponding to the brackets 13 for the front axle are, however, not secured by being bolted through the straight part of the axle, as in Figure 1, because a hollow axle is used. They are bolted to the wall of the housing of this axle as shown at 51 in Figure 10. Also the shafts 35 are pivotally mounted in bearing blocks 36 upon the frame member 26. The radius rods 52 illustrated in Figure 2 are of any standard type. They form no part of the present invention, but are illustrated to assist in explaining the advantages of certain features of the invention.

In the operation of the device, the weight of the vehicle causes a downward thrust at the bolts 24. The links 18, however, prevent more than a very slight downward movement of the outer ends of the arms 22. The ends of the arms 30 must therefore descend, and in descending they compress the springs 45 and 45'. This compression will stop when the stress of the springs multiplied by the leverage through which they act is sufficient to counterbalance the weight of the vehicle.

When the vehicle is running upon the road and it passes over rough places, there will at times result a certain upward motion of one of the axles. The inertia of the vehicle makes this equivalent to a certain descent of the pivots 24 or at least one of them. The result is a further compression of the springs 45 and 45'. This upward motion of the axle is, however, temporary, and as soon as it ceases the resilient force of the springs causes an upward motion of the collar 34 which, acting on the lever 23, causes a somewhat smaller upward motion of the pivot 24 and so of the vehicle. Inertia again prevents the last described motion from stopping as soon as the point of equilibrium is reached, but it continues past this point and the collars 34 therefore ascend beyond the point of equilibrium. In doing so they compress the springs 44 and thus do not go far beyond the point of equilibrium. Thus the vehicle is quickly brought to rest after having passed over a rough place in the road.

In the foregoing description the springs have been spoken of as if they acted only when their compression was increased. As a matter of fact, the springs both 45 and 44 act all the time, the action of one increasing and the action of the other decreasing corresponding to each motion of the collar 34.

The up and down motion of the vehicle is not directly vertical. This is due at least in part to the action of the radius rods 52 which cause the front suspension to move about the forward axle as a pivot. The action of the pivots 24, however, keeps the levers 23 in a vertical plane. In order to accomplish this movement without any twisting effect upon the levers 23 or binding of the pivots 24, the forward motion of the vehicle is accommodated by the blocks 15 pivoting about the bolt 14 and so permitting a small forward and backward motion of the arms 20 and links 18. In order that the resulting movement of the pivot 21 shall not twist it out of the horizontal, the universal joint illustrated in Figures 8 and 9 is used.

This construction not only cares for the backward and forward movement of the vehicle due to the action of the radius rods, but it also accommodates any such backward and forward movement that may arise from a sudden application of the brakes or other cause.

Again the pivoting of the links 18 about the pivot 19 permits a small sidewise motion of the vehicle which adds to the elasticity of its connection to the running gear. A sidewise motion greater than that accommodated by mere swinging of the links 18 results in the compression of one set of springs 45 and 45' and the expansion of the set of springs 45 and 45' at the other end of the same axle so that the action of the springs in tending to maintain a position of equilibrium will bring the vehicle back to its correct position, no matter in which direction the displacement occurred, and consequently the motion of the vehicle is always easy no matter in what direction the shocks come.

We are aware that numerous details of construction may be varied through a wide range without departing from the principles of this invention, and we therefore do not wish to limit the patent granted otherwise than is necessitated by the prior art.

We claim as our invention:

1. In a vehicle, a cross piece rigid with the vehicle frame, members pivoted near each end of said cross piece, springs resiliently holding one point in each of said members in position relative to said cross piece, and a pivotal connection including a universal joint between another point of said members and the running gear of said vehicle.

2. In a vehicle support, a helical spring, a rod pivoted to the vehicle frame and extending axially through said helical spring, a collar slidably mounted on said rod against which said spring works, and mechanical connections between said collar and the running gear of the vehicle, said connections including a member pivoted to the vehicle frame and a member pivotally mounted on the running gear said latter pivotal mounting including a universal connection.

3. In a vehicle support, a member resiliently held in a normal position and connected to the vehicle frame, a stirrup rigidly connected to the running gear, links connected to said resiliently held member, and a pivotal connection capable of motion in more than one plane connecting said links to said stirrup.

4. A vehicle frame having a cross member, a rod pivotally mounted in said cross member, said rod having a portion at right angles to the axis of its pivot, a spring mounted on said portion, and an arm engaging one end of said spring and pivoted to said cross member at a distance from the mounting of said rod.

5. In a vehicle support, a bell crank having one arm bifurcated, each branch of said bifurcated arm being again bifurcated, and pivotally mounted spring compressing members each located between one pair of the last named bifurcations.

6. In a vehicle, levers pivoted intermediate their length to the vehicle frame and transversely thereof, springs resiliently holding the inner ends of said levers in position relative to said vehicle frame, links connecting the outer ends of said levers with the running gear of the vehicle, said links being pivoted to said levers and running gear at right angles to each other, and intermediate supplemental universal connections between said links and running gear.

In testimony whereof we have hereunto subscribed our names in the presence of two subscribing witnesses.

WILLIAM A. McCRACKEN.
ARTHUR H. BUTZKE.

Witnesses:
 GEORGE N. BLATT,
 LORENE HAUSER.